United States Patent Office 2,759,816
Patented Aug. 21, 1956

2,759,816
POLYVINYL SULFONAMIDE COLOR COUPLERS

Louis M. Minsk, Rochester, N. Y., assignor to Eastman Kodak Company, Rochester, N. Y., a corporation of New Jersey No Drawing. Application December 9, 1952,
Serial No. 325,031

7 Claims. (Cl. 95—6)

This invention relates to color photography and particularly to resin couplers for use in photographic layers.

In certain color photographic processes, such as those described in Fischer U. S. Patent 1,102,028, it is desirable to use color couplers which do not diffuse through the gelatin or the other colloid of the emulsion. Polymeric couplers have been suggested for this purpose, but frequently such couplers do not yield dyes having sufficient tinctorial strength to be satisfactory for purposes of color photography.

I have found that a new family of non-diffusing polymeric couplers may be prepared by the reaction of a polymer containing sulfonyl chloride groups with a coupler having an amino group in its molecule. Polymeric couplers thus prepared yield dyes of high color intensity for the weight of resin coupler used. The dyes derived from these couplers by coupling with the oxidation product of primary aromatic amino developing agents show no diffusion or wandering in the matrix colloid in which they are incorporated.

The couplers which I propose to use are prepared from polymeric sulfonyl chlorides, such as polyvinylbenzene sulfonyl chloride, polyvinyl sulfonyl chloride, polyvinylnaphthalene sulfonyl chloride, polyacrylophenyl sulfonyl chloride, as well as sulfonyl chlorides of condensation polymers with aromatic nuclei. They have the recurring structure —CH—CH$_2$—
|
(R)$_{n-1}$—SO$_2$NHO' or preferably the recurring structure

—CH—CH$_2$—
|
⌬—SO$_2$NHR' in which R is a group containing an aryl radical, e. g. phenyl or naphthyl, R' is a coupler including an aryl group, and $n$ is an integer from 1 to 2.

This formula illustrates the coupling product. However, included in the molecule are controllable amounts of combined vinyl benzene sulfonic acid. Other combined components may be included in the molecule. The ratio of combined vinyl sulfonamide coupler to vinyl sulfonic acid may be varied as pointed out hereinafter.

Representative polymeric sulfonyl chlorides contain recurring units having the structure —CH—CH$_2$—
|
⌬—SO$_2$Cl Polyvinylbenzene sulfonyl chloride —CH—CH$_2$—
|
SO$_2$Cl Polyvinyl sulfonyl chloride —CH—CH$_2$—
|
⌬⌬—SO$_2$Cl Polyvinylnaphthalene sulfonyl chloride —CH—CH$_2$—
|
CO
|
⌬—SO$_2$Cl Polyacrylophenyl sulfonyl chloride The preparation of polyvinylbenzene sulfonyl chloride is described in Reynolds and Cathcart U. S. Patent 2,725,368.

Typical couplers were prepared according to my invention as follows:

Example 1

—CH—CH$_2$—
|
⌬—SO$_2$NH—⌬—NHCOCH$_2$CO—⌬

In an all-glass reflux outfit equipped with a mechanical stirrer and a reflux condenser provided with a calcium chloride tube, 3.3 g. of polyvinylbenzenesulfonyl chloride (C=49.6%, H=4.2%, S=14.0%, Cl=10.8%) were dispersed with stirring in 33 cc. of dimethyl formamide. To the dope was added 4.5 g. of benzoylaceto-(p-amino)-anilide followed by 5 cc. of pyridine. The reaction mixture was heated on a steam bath with stirring for one-half hour. The orange-brown dope obtained was poured into 1½ liters of distilled water containing 50 cc. concentrated hydrochloric acid, with stirring. The precipitate turned friable with stirring. It was filtered, washed with distilled water, and dried in a desiccator over calcium chloride under constant water pump vacuum. The product obtained was dispersed in 70 cc. of 5:2 acetone and water. Four grams of decolorizing carbon (Norite) were added and the solution was brought to a boil on a steam bath. The dope was filtered by suction through paper covered by a layer of filter aid. The product was isolated by precipitating the dope in 1 liter of distilled water containing 25 cc. of concentrated hydrochloric acid. The precipitate was filtered onto paper by gravity, washed chloride free with distilled water and dried in a desiccator over calcium chloride under constant water pump vacuum. Yield 4½ grams (N=5.55%, S=7.6%, Cl=<1%. Calculates as 82.2% combined polyvinyl sulfonamide coupler, 7.2% combined vinyl benzene sulfonic acid, and 10.6% combined styrene).

Example 2

—CH—CH$_2$—
|
⌬—SO$_2$NH—⌬(OH, Cl, CH$_3$, Cl)

In an outfit as described in Example 1, 3.3 grams of polyvinylbenzenesulfonyl chloride were dispersed in 33 cc. dimethyl formamide. To the dope was added with stirring 3.5 g. of 2-amino-4,6-dichloro-5-methyl phenol, followed by 5 cc. of pyridine. The orange dope obtained was heated on a steam bath for one hour. The deep tan dope was poured into 1500 cc. of absolute ethyl alcohol to precipitate the product. The precipitate was extracted with fresh ethyl alcohol and dried in a desiccator over calcium chloride under constant water pump vacuum. Yield 4.5 grams (N=4.5%, S=10.05%, Cl=8.15%. Calculates as 41.1% combined polyvinyl sulfonamide coupler, 52.4% combined vinylbenzene sulfonic acid pyridine salt, 6.5% combined styrene).

*Example 3*

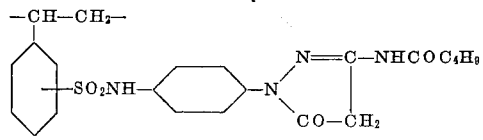

As in Example 1, 3.3 grams of polyvinylbenzenesulfonyl chloride was reacted with 6.6 grams 1-(p-amino phenyl)-3-butyramido-5-benzoxy pyrazole. After thirty minutes on a steam bath the product was precipitated in 2 liters distilled water containing 50 cc. concentrated hydrochloric acid. The friable yellow precipitate was washed with water and redissolved in 100 cc. of acetone. Six grams of decolorizing carbon (Norite) were added. The suspension was brought to a boil, filtered and poured into 1½ liters of ether. The precipitate was washed with ether and dried in a desiccator over calcium chloride under constant water pump vacuum. Yield 3.7 g. (N=8.3%, S=7.1%, Cl=1%. Calculates as 78.6% combined polyvinyl sulfonamide coupler, 12.9% combined vinyl benzene sulfonic acid, and 8.5% combined styrene).

The product dissolves in dilute sodium hydroxide with heating on a steam bath, simultaneously saponifying of the benzoxyl group. It now couples strongly to give a magenta.

The couplers used for reaction with the polymeric sulfonyl chlorides include any couplers containing a free primary or secondary amino group, such as compounds 16 and 51, and compounds 15, 17 and 40 having the nitro group reduced to an amino group, of U. S. Patent 2,369,489, compounds 4 and 11 having the nitro group reduced to an amino group, of U. S. Patent 2,521,908, and the compounds of U. S. Patents 2,563,375 and 2,563,376.

The ratio of combined vinyl sulfonamide coupler to vinyl sulfonic acid in my compounds may be varied by 1) varying the proportion of the reactants and 2) by varying the degree of chlorosulfonation of the polymeric intermediate.

The couplers of my invention are incorporated in a silver halide emulsion as shown for example in the following:

*Example 4*

A 1.0 gram portion of the reaction product of polyvinylbenzene sulfonyl chloride and 2-amino-4,6-dichloro-5-methylphenol (Example 2) was dissolved in 40 cc. of water containing excess alkali to hasten the solution. The solution was neutralized and mixed with a standard silver halide emulsion containing 9 percent gelatin and 3 percent silver. Coatings of this mixture yielded cyan images of suitable contrast and density when exposed and developed in a developer of the composition given below:

|  | Grams |
|---|---|
| 2-amino-5-diethylaminotoluene HCl | 2 |
| Sodium sulfite | 2 |
| Sodium carbonate | 20 |
| Potassium bromide | 2 |
| Water to 1 liter. | |

The extremely low diffusion of this type of coupler makes it particularly useful in multilayer color processes.

*Example 5*

The reaction product of polyvinylbenzene sulfonyl chloride and 1-(p-aminophenyl)-3-butyramido-5-benzoxy pyrazole (Example 3) was dispersed and mixed with emulsion as in Example 4. Coatings of this material when exposed and developed in a color developer of the composition stated above gave a negative magenta image of good density and contrast. The diffusion of this coupler in a multilayer coating is insignificant and stability properties of both coupler and dye are excellent.

*Example 6*

In a manner similar to that of Examples 4 and 5, the reaction product of polyvinylbenzene sulfonyl chloride and benzoylaceto-(p-amino) anilide (Example 1) was dispersed and coated. A yellow-orange image of good density and contrast was obtained by color development using a developing agent of the p-phenylenediamine type. The coupler showed very little diffusion, and good stability to heat and light.

The polyvinylbenzene sulfonyl chlorides are prepared by first sulfonating polystyrene in a chlorinated, aliphatic organic solvent such as ethylene chloride, with a coordination complex of sulfur trioxide and $\beta,\beta'$-dichloroethyl ether, and after isolation of the sulfonic acid derivative thereby obtained, reacting it with phosphorus pentachloride to give the acid chloride derivative. Further details of the preparation are contained in Reynolds and Cathcart U. S. Patent 2,725,368.

The couplers of my invention may be used in single layer or multilayer coatings, or in mixed grain systems.

It will be understood that the examples and modifications included herein are illustrative only, and that my invention is to be taken as limited only by the scope of the appended claims.

I claim:

1. A silver halide emulsion containing as a non-diffusing color former a polymeric coupler prepared by reacting a polyvinyl sulfonyl chloride with an amino-substituted color former capable of reacting with the oxidation product of a primary aromatic amino developing agent.

2. A silver halide emulsion containing as a non-diffusing color former a polymeric coupler having recurring units of the structure:

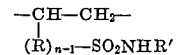

where R is a group containing an aryl radical, R' is a color former capable of reacting with the oxidation product of a primary aromatic amino developing agent, including an aryl group and $n$ is an integer from 1 to 2.

3. A silver halide emulsion containing as a non-diffusing color former a polymeric coupler having recurring units of the structure:

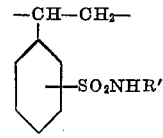

where R' is a color former capable of reacting with the oxidation product of a primary aromatic amino developing agent, including an aryl group.

4. A silver halide emulsion containing as a non-diffusing color former a polymeric coupler having recurrent units of the structure:

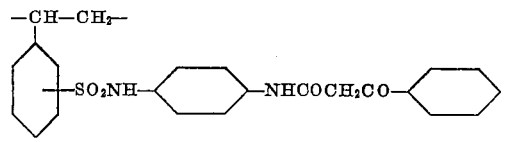

5. A silver halide emulsion containing as a non-diffusing color former a polymeric coupler having recurring units of the structure:

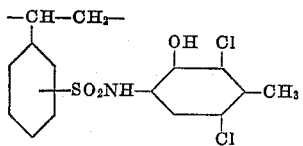

6. A silver halide emulsion containing as a non-diffusing color former a polymeric coupler having recurring units of the structure:

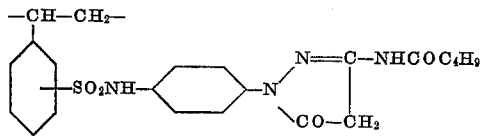

7. The process of producing color-developed dye images in a photographic silver halide emulsion which comprises exposing the emulsion of claim 2 and developing it with a primary aromatic amino developing agent.

References Cited in the file of this patent

UNITED STATES PATENTS

| | | |
|---|---|---|
| 2,531,469 | Reynolds et al. | Nov. 28, 1950 |
| 2,538,257 | Martin | Jan. 16, 1951 |
| 2,540,401 | Merck | Feb. 6, 1951 |
| 2,571,761 | Reynolds et al. | Oct. 16, 1951 |
| 2,646,421 | Allen et al. | July 21, 1953 |